(12) United States Patent
Benoit et al.

(10) Patent No.: US 6,420,686 B1
(45) Date of Patent: Jul. 16, 2002

(54) APPARATUS FOR JOINING METAL COMPONENTS

(75) Inventors: Robert L. Benoit, Oakdale; Anthony Mascolo, Islip Terrace; Bernard I. Rachowitz; Glenn L. Spacht, both of Lloyd Neck, all of NY (US)

(73) Assignee: Fuel Cell Components and Integrators, Inc., Hauppauge, NY (US)

( * ) Notice: Subject to any disclaimer, the term of this patent is extended or adjusted under 35 U.S.C. 154(b) by 0 days.

(21) Appl. No.: 09/562,136

(22) Filed: May 1, 2000

(51) Int. Cl.[7] ............................................... B23K 13/01
(52) U.S. Cl. ..................... 219/603; 219/610; 219/607
(58) Field of Search ................................. 219/603, 607, 219/610, 614, 615, 616, 617, 535, 544, 602; 156/304.2; 285/21.2, 41; 228/114.5, 111.5

(56) References Cited

U.S. PATENT DOCUMENTS

| | | | | | |
|---|---|---|---|---|---|
| 3,985,280 A | * | 10/1976 | Yamaji et al. | ............ | 228/111.5 |
| 4,150,274 A | * | 4/1979 | Minin et al. | ................ | 219/610 |
| 5,777,299 A | * | 7/1998 | Dominici | .................... | 219/607 |
| 6,166,359 A | * | 12/2000 | Cruickshank | ............... | 219/607 |

* cited by examiner

*Primary Examiner*—Teresa Walberg
*Assistant Examiner*—Quang Van
(74) *Attorney, Agent, or Firm*—Salzman & Levy

(57) ABSTRACT

An apparatus has a single workstation for joining high strength metal components by electromagnetic forming techniques. One of the metal components carries high loads or is subjected to combined stresses and strains, thus requiring that it be relatively strong and ductile. EMF or MPW processes are used to join the components, whose strength is temporarily diminished prior to the joining step. The high strength material is subjected to a retrogressive heating and quenching process along a joined boundary thereof and is then electromagnetically joined. Thereafter, the strength of the diminished material is restored to its higher temper and strength. In a first embodiment, the apparatus uses a single coil for both the heating and electromagnetic bonding of the metal. In a second embodiment, two adjacent coils are used and the material is moved along a work path between the coils.

16 Claims, 2 Drawing Sheets

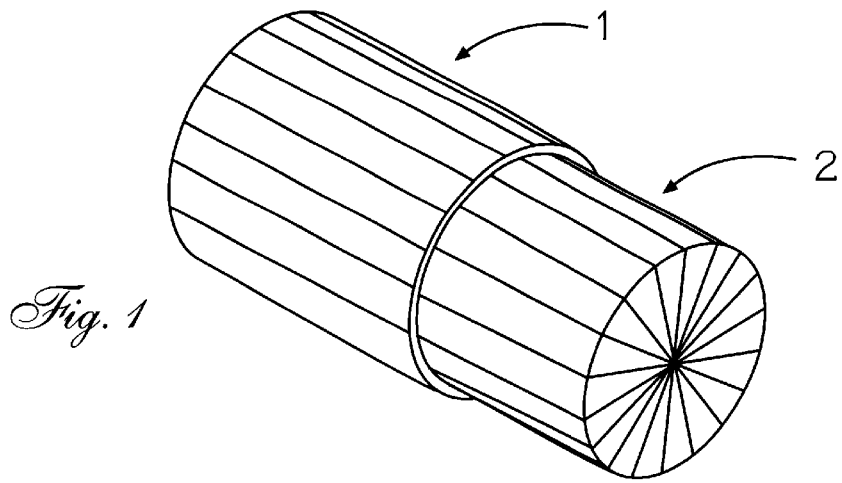
Fig. 1
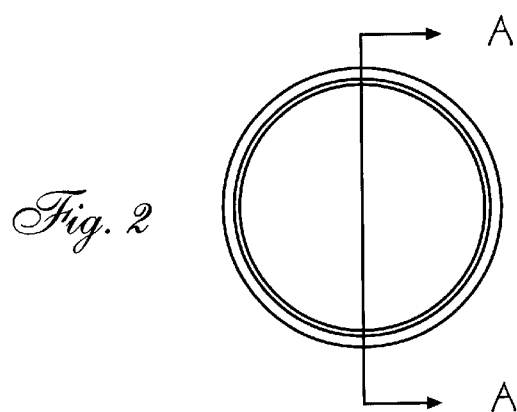
Fig. 2
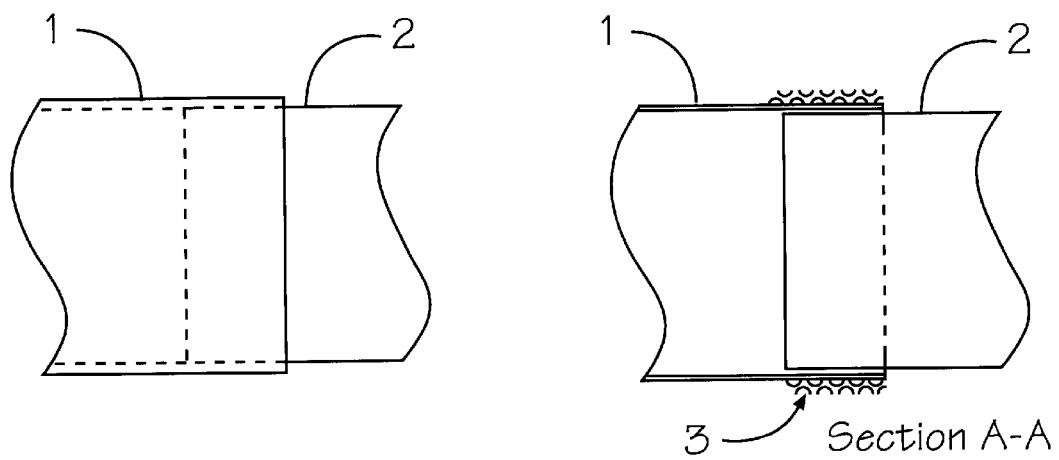
Fig. 3a
Fig. 3b

APPARATUS FOR JOINING METAL COMPONENTS

FIELD OF THE INVENTION

The present invention relates to apparatuses for joining metal components and, more particularly, to a machine for joining metal components by utilizing retrogressive heat and magnetic bonding techniques.

BACKGROUND OF THE INVENTION

It is often desirable to join lightweight aluminum alloy tubes to aluminum or steel fittings for the purpose of transmitting torque or axial forces. It is desirable to employ steel end fittings in some cases, because of the great applied forces. For example, the forward end of a torque transmitting driveshaft is splined. The spline is inserted into the aft end of the transmission. It slides in and out of the transmission during the course of the normal shifting operation, while the suspension of the automobile moves up and down. The combined torque and vertical movement increases stress and strain upon the spline, therefore making steel the often preferred choice of material. Steel is also significantly less expensive than aluminum. Where weight is of primary importance, however, aluminum end fittings which are one third the weight of steel are used.

Aluminum cannot be joined to steel using conventional welding methods. Other methods have proven to be difficult and expensive to attach an aluminum tube to a steel end fitting in most applications that require significant loads and torque. Bonding, friction welding, and mechanical fastening have been employed with various degrees of success, but the joined materials generally have a shortened operational life. Conventional welding can be used to join aluminum tubes to aluminum end fittings but because heat is inherent in the process, distortion and localized annealing or weakening of the aluminum tube occurs. This requires that the tube is thickened to compensate for this effect. This results in a heavier, more expensive assembly.

The present invention includes apparatus for accomplishing the joining of dissimilar metals by a new electromagnetic attachment of the tube to the fitting. Electromagnetic forming (EMF) or magnetic pulse welding (MPW) has been used in the past with some success, where the materials are not required to carry high or combined load forces. In these processes, electromagnetic fields are created around the tube which create an opposing field in the tube. The two fields repel one another, causing the tube to deform inwardly onto the end fitting.

With the use of MPW, the tube forms a molecular bond with the end fitting. In the case of EMF, a mechanical joint is formed, which deforms the tube into a groove pattern disposed in the end fitting. The electrical energy required to perform the MPW or EMF processes successfully, in order to join metals, increases as the yield strength of the material increases. Therefore, a problem arises when the metal being deformed is high strength aluminum. In addition, the ductility of the material generally decreases as yield strength increases, making it still more difficult to form a successful EMF or MPW joint using high strength aluminum alloys, such as 6061-T6, or 6013-T6.

In order to join a high strength aluminum tube to an aluminum or steel fitting, the inventive apparatus subjects the aluminum tube to local regressive heat treatment (RHT), prior to electromagnetic deformation. In other words, the aluminum is subjected to inductive heating prior to electromagnetic forming or magnetic pulse welding. The RHT process involves elevating the temperature of the material to approximately one thousand degrees Fahrenheit and then quenching the aluminum in water. The regressive heat treatment reduces the yield strength of the tube, while increasing its ductility for a period of several hours. The aluminum, which has been subjected to the RHT process, gradually regains its temper. Eventually, the aluminum tube develops properties greater than T4 aluminum, but less than those of T6 aluminum. The strain induced in the material by the EMF and MPW processes locally increases the temper of the material due to work hardening. After the EMF or MPW process, the material may be subjected to additional heat or an aging process in order to increase the temper of the tube to a final, higher temper value.

The regressive heat treatment (RHT) is accomplished by means of an inductive heating coil, wrapped about the tube to be deformed. Inductive heating is accomplished by passing alternating current through the coil. The frequency voltage and current in the coil is a function of the geometry of the tube and coil. At the conclusion of the RHT cycle, the tube is subjected to the electromagnetic force in order to assemble the tube to the end fitting, as aforementioned. In one approach, the same coil is electrically connected by means of a switching device to a capacitor bank and discharging system. Thereafter, the coil can be utilized to generate the electromagnetic fields needed for EMF or MPW processes.

As a result of combining both the RHT and the EMF or MPW processes into a single coil function, the apparatus of the invention has the advantage of accomplishing the fabrication of the joined parts at a single work station. The single work station provides a further advantage in that the parts need not be moved and refixtured upon another machine. This reduces time, space, and cost.

In an alternate approach, the apparatus of this invention uses two coils at a single work station. The tubular material is heat treated by a first coil, and then the tube is deformed by a second coil. Although this second approach is not as compact as is the first approach, it does not require a switching device. The respective designs of the individual first and second coils are less complex than the combined function coil of the first method. In addition, both coils can be functionally optimized for their individual purpose.

DISCUSSION OF RELATED ART:

In U.S. Pat. No. 3,258,573, issued to Morin et al on Jun. 28, 1966, for WELDING AND FORMING METHOD AND APPARATUS, an apparatus is illustrated that utilizes a coil that is controlled through a current selecting means. The selection means provides a choice to power the coil for welding or for electromagnetic forming.

In U.S. Pat. No. 3,603,759, issued on Sep. 7, 1971 to Peacock, for WELDING AND FORMING METHOD, magnetic forces are utilized to force members together at an interface.

In U.S. Pat. No. 3,794,805, issued to Rudd on Feb. 26, 1974, for MAGNETIC PULSE WELDING USING SPACED PROXIMITY CONDUCTOR, an apparatus is shown with a switching circuit that can apply a pulse of magnetic pressure about a proximity conductor positioned adjacent the workpiece.

In U.S. Pat. No. 3,944,641, issued to Lemelson on Mar. 16, 1976, for PROCESS OF FORMING AN IRREGULAR SURFACE ON THE INSIDE OF A TUBE OR PIPE, an apparatus and method are illustrated for providing the inside of a pipe with an irregularly shaped surface. An inner liner of the pipe is extruded or subjected to an electromagnetic field, in order to vary the surface configuration or roughness of the internal surface.

In U.S. Pat. No. 4,990,732, issued on Feb 5, 1991 to Dudko et al, for DISCHARGE DEVICE FOR MAGNETIC-PULSE WORKING AND WELDING OF METALS, an apparatus is shown wherein a discharge device provides for both electromagnetic working and pulse welding of metals.

In U.S. Pat. No. 5,218,763, issued on Jun. 15, 1993 to Marker et al, for METHOD FOR MANUFACTURING A SWAGED PISTON ASSEMBLY FOR AN AUTOMOBILE AIR CONDITIONING COMPRESSOR, a 1018 steel alloy connecting rod is fabricated with an aluminum alloy head. Cold swaging is used to flare the tip of the connecting rod outwardly, in order to conform and fill a counterbored surface. This provides a strong attachment joint between the parts.

SUMMARY OF THE INVENTION

In accordance with the present invention, there is provided an apparatus by which metal components can be joined together. The metal components carry high loads or are subjected to combined stresses and strains, thus requiring the use of high strength materials. Electromagnetic forming, wherein EMF or MPW processes are used to join the components, cannot be easily accomplished when the materials have high yield strength and ductility. Therefore, in order to provide an electromagnetic forming of these high strength materials, the high strength material is temporarily diminished prior to the joining step. The high strength material is subjected to a retrogressive heating and quenching process, prior to the joining process. This retrogressive heat treatment (RHT) reduces its ductility and yield strength. Thereafter, the material is restored to its higher temper and strength by work hardening and subsequent heat or aging processes. The apparatus, in one embodiment thereof, uses a single coil to perform both the regressive heating and the electromagnetic bonding. A switch is provided to supply the coil first with current for heating the material, and then a discharge of high voltage from a capacitor bank to effect the electromagnetic forming. In a second embodiment of the apparatus, two separate coils are used to effect the respective heating and electromagnetic forming of the material along a process path.

It is an object of this invention to provide an improved apparatus for joining metals using retrogressive heating and an electromagnetic process.

It is another object of the invention to provide an apparatus for joining high strength components by moderate electromagnetic forces.

It is a further object of this invention to provide an apparatus using a single workstation for joining metals, wherein both retrogressive heating and electromagnetic processes are performed therein.

BRIEF DESCRIPTION OF THE DRAWINGS

A complete understanding of the present invention may be obtained by reference to the accompanying drawings, when considered in conjunction with the subsequent detailed description, in which:

FIG. 1 illustrates a perspective, schematic view of two cylindrical components that have been joined together at a boundary by the process of this invention. The cylindrical components comprise an aluminum tube that has been inserted into, and joined with a fitting;

FIG. 2 depicts an end view of the joined components of FIG. 1;

FIG. 3a shows a sectional view of the two cylindrical components taken along lines A—A of FIG. 2;

FIG. 3b illustrates the components of FIG. 3a, having a boundary portion that is subjected to local regressive heat treatment;

DESCRIPTION OF THE PREFERRED EMBODIMENT

Generally speaking, the invention features an apparatus for joining high strength metal components by electromagnetic forming techniques. The metal components carry high loads or are subjected to combined stresses and strains, thus requiring that they be relatively strong and ductile. EMF or MPW processes are used to join the components, whose strength is temporarily diminished prior to the joining step. The high strength material is subjected to a retrogressive heating and quenching process along a joined boundary thereof. Thereafter, the materials are electromagnetically joined, and the strength of the materials at the boundary is restored to its higher temper and strength. A single coil is used in one embodiment of the invention to perform both the heating and magnetic processes upon the material. In a second embodiment, two adjacent coils are used and the material is moved along a work path between the coils.

Now referring to FIGS. 1 through 3a, an aluminum tube 1 is joined with an aluminum or steel fitting 2 by a successful EMF or MPW joint, using high strength aluminum alloys, such as 6061-T6, 6013-T6 or 2024-T3. The aluminum tube 1 is subjected to local regressive heat treatment (RHT) prior to electromagnetic deformation.

The aluminum tube 1 is subjected to inductive heating along a joining boundary layer 3, as shown in FIG. 3b, prior to the electromagnetic forming or magnetic pulse welding. The RHT process involves elevating the temperature of the material to approximately one thousand degrees Fahrenheit, and then quenching the aluminum in water. The regressive heat treatment reduces the yield strength of tube 1, while increasing its ductility for a period of several hours. The aluminum, which has been subjected to the RHT process gradually regains its temper.

Eventually, the aluminum tube 1 develops properties greater than T4 aluminum, but less than those of T6 aluminum. The strain induced in the material by the EMF and MPW processes locally increases the temper of the material due to work hardening. After the EMF or MPW process, the material may be subjected to additional heat or an aging process in order to increase the temper of the tube 1 to a final, higher temper value.

Figure 4:
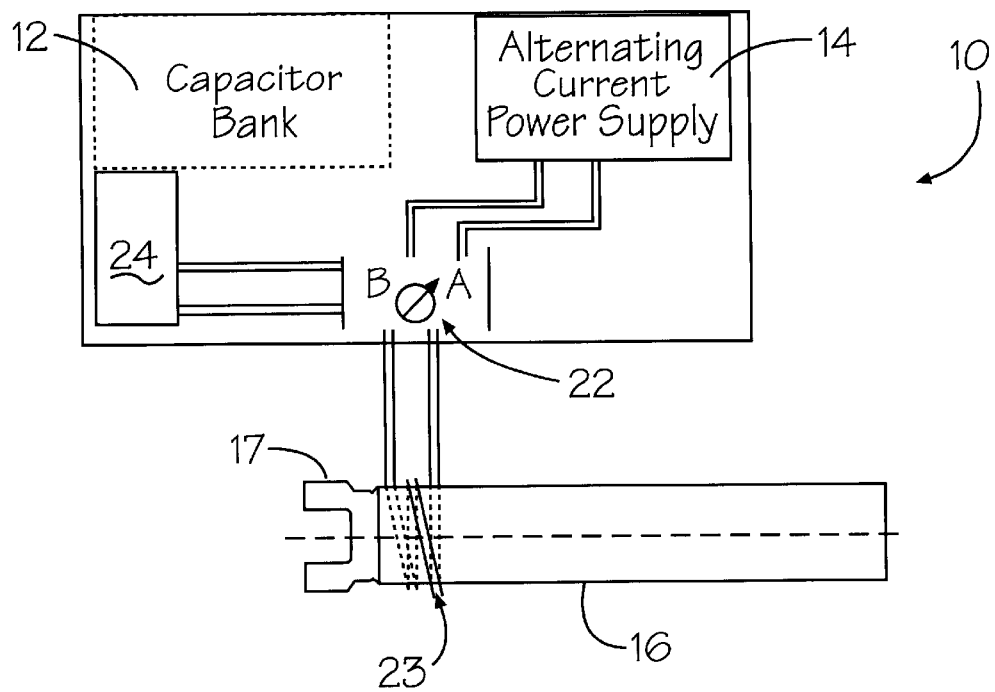
FIG. 4 depicts a schematic view of a first embodiment of the invention using the process described in FIGS. 1 through 3b.

Referring to FIG. 4, a first embodiment is shown of the apparatus 10 of this invention. The apparatus 10 comprises a single coil 23 for performing both the RHT and EMF or MPW. An alternating power supply 14 provides current for heating the tube 16, when switch 22 is in a first position "A", allowing control panel 24 to operate coil 23 in a regressive heating mode. Moving the switch 22 to a second position "B" allows the controls 24 to instruct the capacitor bank 12 to discharge through the coil 23 to deform the tube 16.

As a result of combining both the RHT and the EMF or MPW processes into a single coil function, the apparatus of the invention has the advantage of accomplishing the fabrication of the joined parts at a single work station. The single work station provides a further advantage in that the parts need not be moved and refixtured upon another machine. This reduces time, space, and cost.

Figure 5:
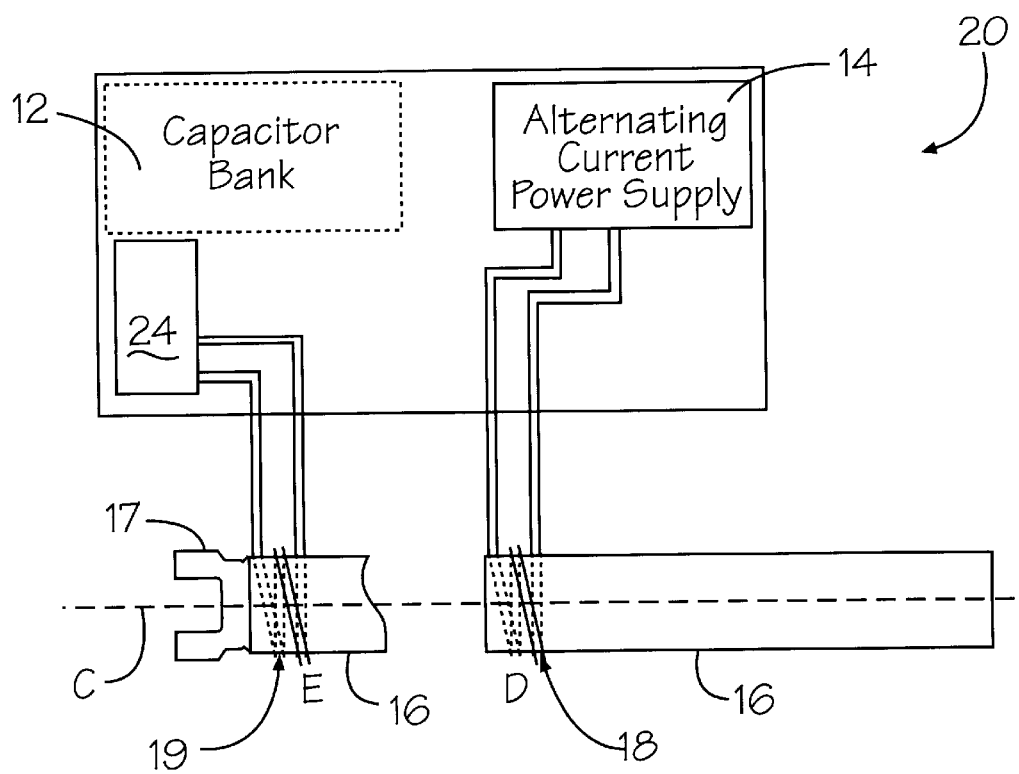
FIG. 5 shows a schematic view of a second embodiment of the invention using the process described in FIGS. 1 through 3b.

Referring to FIG. 5, a second embodiment of the apparatus 20 of this invention is shown. The apparatus 20 uses an alternate approach, wherein two coils 18 and 19 are spaced apart upon a single workstation, along a work axis "C". The tube 16 is heat treated by the first coil 18 connected to the alternating current power supply 14 at position "D". Then the heat treated tube 16 is moved laterally to position "E", where the second coil 19, connected to capacitor bank 12 via control panel 24, provides the electromagnetic force to deform the material.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. An apparatus for joining two dissimilar metal components together, comprising:

heating means for subjecting one of said two components to a regressive temperature process to reduce its yield strength and ductility prior to joining said two components together by an electromagnetic process;

joining means for joining said two components along a common boundary by said electromagnetic process; and a commonly shared coil connected to said heating and joining means for alternately heating and then joining said two components.

2. The apparatus for joining two components together in accordance with claim 1, wherein said joining means performs an electromagnetic forming process via said commonly shared coil.

3. The apparatus for joining two components together in accordance with claim 1, wherein said joining means performs a magnetic pulse welding process via said commonly shared coil.

4. The apparatus for joining two components together in accordance with claim 1, wherein said two components are substantially tubular.

5. The apparatus for joining two components together in accordance with claim 1, wherein said one of said two components comprises aluminum.

6. The apparatus for joining two components together in accordance with claim 5, wherein said aluminum comprises 6013-T6 or 6061-T6 aluminum.

7. The apparatus for joining two components together in accordance with claim 5, wherein said aluminum comprises 2024-T3 aluminum.

8. The apparatus of claim 1, further comprising switching means connected to said heating and joining means, said switching means alternately actuating said heating and said joining means.

9. A single workstation for both heating and joining two components together through a single, commonly shared coil, comprising:

heating means for subjecting one of said two components to a regressive temperature process to reduce its yield strength and ductility prior to joining said two components together by an electromagnetic process;

joining means for joining said two components along a common boundary by an electromagnetic process; and a commonly shared coil connected to said heating and joining means for alternately heating and then joining said two components.

10. The single workstation in accordance with claim 9, wherein said joining means performs an electromagnetic forming process via said commonly shared coil.

11. The single workstation in accordance with claim 9, wherein said joining means performs a magnetic pulse welding process via said commonly shared coil.

12. The single workstation in accordance with claim 9, wherein said two components are substantially tubular.

13. The single workstation in accordance with claim 9, wherein said one of said two components comprises aluminum.

14. The single workstation in accordance with claim 13, wherein said aluminum comprises 6013-T6 or 6061-T6 aluminum.

15. The single workstation in accordance with claim 13, wherein said aluminum comprises 2024-T3 aluminum.

16. The single workstation in accordance claim 9 further comprising switching means connected to said heating and joining means, said switching means alternately actuating said heating and said joining means.

* * * * *